United States Patent [19]

Saitoh et al.

[11] Patent Number: 5,566,027
[45] Date of Patent: Oct. 15, 1996

[54] PHOTOCURABLE RESIN COMPOSITION AND OPTICAL LENS PRODUCED THEREFROM

[75] Inventors: Osamu Saitoh, Ageo; Haruo Tomono, Machida, both of Japan

[73] Assignee: Canon Kabushiki Kaisha, Tokyo, Japan

[21] Appl. No.: 570,249

[22] Filed: Dec. 11, 1995

Related U.S. Application Data

[63] Continuation of Ser. No. 182,563, Jan. 18, 1994, abandoned.

[30] Foreign Application Priority Data

Jan. 18, 1993 [JP] Japan ................... 5-005954

[51] Int. Cl.$^6$ ............... G02B 3/08; G02B 9/00; C08L 75/16; C08F 2/50
[52] U.S. Cl. ............ 359/796; 359/708; 359/742; 359/743; 359/797; 522/90; 522/96
[58] Field of Search ............... 522/90, 96, 97; 359/796, 726, 797, 708, 716, 717, 742, 743; 351/44

[56] References Cited

U.S. PATENT DOCUMENTS 4,376,800  3/1983  Lu et al. ................... 522/96
4,844,594  7/1989  Gossink ................... 350/417
4,890,905  1/1990  Van Rosmalen et al. ............. 350/482
5,264,160  11/1993  Arai et al. ................... 264/1.4
5,286,421  2/1994  Arai ................... 264/1.7

FOREIGN PATENT DOCUMENTS 62-258401  11/1987  Japan.

*Primary Examiner*—Susan W. Berman
*Attorney, Agent, or Firm*—Fitzpatrick, Cella, Harper & Scinto

[57] ABSTRACT

A resin layer having an improved durability may be obtained by curing a photocurable resin composition, including: (A) a polyfunctional urethane-modified polyester (meth)acrylate comprising a polyester oligomer and a plurality of (meth)acryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator. The cured resin layer shows a Young's modulus which shows a small temperature-dependence, and reduces the possibility of peeling of an optional overcoating layer formed thereon.

10 Claims, 2 Drawing Sheets

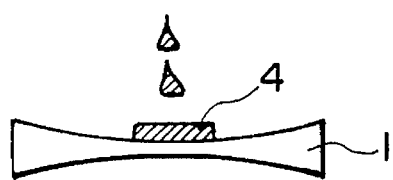
F I G. 5
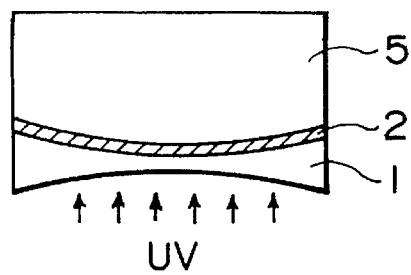
F I G. 6
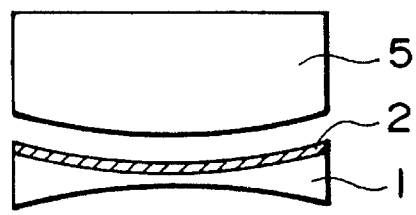
F I G. 7

PHOTOCURABLE RESIN COMPOSITION AND OPTICAL LENS PRODUCED THEREFROM

This application is a continuation of application Ser. No. 08/182,563 filed Jan. 18, 1994, now abandoned.

FIELD OF THE INVENTION AND RELATED ART

The present invention relates to a photocurable resin composition, particularly one used for constituting a surface resin layer of an optical lens, and an optical lens produced by using the photocurable resin composition.

Hitherto, there has been known a type of optical lens comprising a resin layer coating the surface of a glass lens as the base member. Such an optical lens having a coating resin layer (hereinafter referred to as a "replica lens") can be provided with an arbitrary surface shape by molding and is therefore useful for providing a profile lens, such as an aspherical lens or a Fresnel lens.

Many proposals have been made regarding ultraviolet-curable resin compositions used for replica lenses. For example, Japanese Laid-Open Patent Application (JP-A) 62-258401 discloses an ultraviolet-curable resin composition comprising a two- to four-functional urethane-modified polyester (meth)acrylate, a tri-functional (meth)acrylate, a mono-functional (meth)acrylate and a photopolymerization initiator, and an optical lens coated with such a resin composition.

The optical lens disclosed by JP-A 62-258401 shows a generally excellent durability, but there is still desired an optical lens which shows a further excellent durability so as to be free from surface scratch, crack or distortion even in a severer environment.

Further, optical lenses are frequently provided with an anti-reflection overcoating layer. In such a case, if the surface resin layer is accompanied with a distortion, the anti-reflection layer is liable to crack or peel from the resin layer.

SUMMARY OF THE INVENTION

An object of the present invention is to provide a photocurable resin composition providing a cured product showing an excellent durability, such as a surface resin layer of an optical lens which is resistant to surface scratch, crack or distortion.

Another object of the present invention is to provide an optical lens produced from the composition.

According to the present invention, there is provided a photocurable resin composition, comprising:

(A) a polyfunctional urethane-modified polyester (meth)acrylate comprising a polyester oligomer and a plurality of (meth)acryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator.

According to the present invention, there is further provided an optical lens comprising a base member, and a resin layer formed on the base member and comprising a cured product of the above-mentioned photocurable resin composition.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5–7 are schematic sectional views showing steps for producing an optical lens according to the invention including a step of supplying a photocurable resin composition of the invention onto a base member (FIG. 5), a step of photo-irradiating the photocurable resin composition between a mold and a base member (FIG. 6), and a step of separating the mold from the optical lens (FIG. 7).

DETAILED DESCRIPTION OF THE INVENTION

Figure 1:
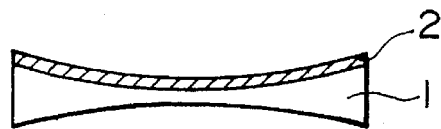
FIGS. 1–4 are respectively a sectional view showing an embodiment of the optical lens according to the invention.

The photocurable resin composition according to the present invention is curable on exposure to light or actinic rays, particularly ultraviolet rays, and comprises:

(A) a polyfunctional urethane-modified polyester (meth)acrylate comprising a polyester oligomer and a plurality of (meth)acryloyl groups bonded to the polyester oligomer via a urethane group, and having a number-average molecular weight of at least 700, (B) a polyfunctional (meth)acrylate having a number-average molecular weight of less than 700, (C) a monofunctional (meth)acrylate, and (D) a photopolymerization initiator.

The photocurable resin composition according to the present invention is particularly suitable for constituting a surface resin layer of a replica lens (i.e., a type of optical lens comprising a lens as a base member and a resin layer coating the surface of the lens.

The polyfunctional urethane-modified polyester (meth)acrylate (A) having a number-average molecular weight of at least 700 comprises as its main chain skeleton a polyester oligomer synthesized from a polybasic acid and a polyhydric alcohol, and may for example be produced by combining one isocyanate group of a diisocyanate with hydroxyl groups at terminal parts of the main chain or side chain(s) of the polyester oligomer and combining a hydroxyl group of a hydroxyl group-containing (meth)acrylate with the other isocyanate group of the diisocyanate. The polyfunctional urethane-modified polyester (meth)acrylate (A) may preferably be two (bi)- to four (tetra)-functional, i.e., have two or four (meth)acryloyl groups. Correspondingly, it is preferred that the polybasic acid and the polyhydric alcohol respectively have two- to four-functional groups.

Preferred examples of the tetra-basic acid may include: tetra-basic acids, such as pyromellitic acid, 2,3,3',4-biphenyltetracarboxylic acid, benzophenonetetracarboxylic acid and bis(3,4-dicarboxyphenyl)methane, and their anhydrides.

Preferred examples of the tribasic acid may include: inherently tribasic acids, such as trimellitic acid, derived tribasic acids obtained, e.g., by partially esterifying tetra-basic acids, such as pyromellitic acid, 2,3,3',4-biphenyltetracarboxylic acid, benzophenonetetracarboxylic acid and bis(3,4-dicarboxyphenyl)methane, and anhydrides of these tribasic acids.

Preferred examples of the dibasic acid may include: phthalic anhydride, isophthalic acid, terephthalic acid, succinic acid and anhydride thereof, adipic acid, azelaic acid, sebacic acid, tetrahydrophthalic anhydride, hexahydrophthalic anhydride, maleic anhydride, fumaric acid, and itaconic acid.

Preferred examples of the trihydric and tetrahydric alcohols may include: glycerol, trimethylolmethane, trimethylolethane, trimethylolpropane, pentaerythritol monoallyl ether, and pentaerythritol.

Preferred examples of the dihydric alcohol may include: ethylene glycol, propylene glycol, neopentyl glycol, diethylene glycol, dipropylene glycol, hydrogenated bisphenol A, 2,2'-di(4-hydroxypropoxyphenyl)propane, 1,3-butanediol, 1,4-butanediol, 1,5-pentanediol, 1,6-hexanediol, trimethylene glycol, triethylene glycol, and pentaerythritol diallyl ether.

Preferred examples of the diisocyanate may include: tolylene diisocyanate, 4,4'-diphenylmethane diisocyanate, xylylene diisocyanate, hexamethylene diisocyanate, isophorone diisocyanate, lysine diisocyanate, and hydrogenated xylene diisocyanate.

Preferred examples of the hydroxyl group-containing (meth)acrylate may include: 2-hydroxyethyl (meth)acrylate, hydroxypropyl (meth)acrylate, polyethylene glycol mono(meth)acrylate, polypropylene glycol mono(meth)acrylate, glycerol mono(meth)acrylate, and glycerol di(meth)acrylate.

As is sometimes used in this field, the term (meth)acrylate is intended to inclusively refer to an acrylate having an acryloyl group and a methacrylate having a methacryloyl group. Similarly, the term (meth)acryloyl group is intended to refer to acryloyl group and methacryloyl group inclusively.

More specifically, the polyfunctional urethane-modified polyester (meth)acrylate (A) may be obtained by subjecting a polyhydric alcohol and a polybasic acid to condensation to obtain a polyester oligomer and subjecting the polyester oligomer to addition of a diisocyanate and then to addition of a (meth)acrylate. Alternatively, it is also possible to react the polyester oligomer with an isocyanate having an unsaturation as represented by the following formula:

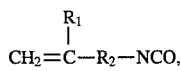

wherein $R_1$ denotes hydrogen or a methyl group and $R_2$ denotes $-COOC_nH_{2n}-$ (n: an integer of 1–8), so as to have the isocyanate group react with hydroxyl groups at terminal parts of the main chain or side chain(s) of the polyester oligomer, thereby obtaining such a polyfunctional urethane-modified polyester (meth)acrylate (A).

Examples of the isocyanate represented by the above formula may include: isocyanate-methyl (meth)acrylate, isocyanate-ethyl (meth)acrylate, isocyanate-propyl (meth)acrylate, isocyanate-octyl (meth)acrylate, p-methacryloxy-α,α-dimethylbenzyl isocyanurate, and m-acryloxy-α,α-dimethylbenzyl isocyanurate.

The polyester oligomer for constituting the polyester (meth)acrylate (A) may be synthesized by a known condensation reaction under heating at, e.g., 150°–250° C. The reaction may appropriately be stopped when the acid value of the system reaches 5 or below, to obtain a desired polyester oligomer having terminal —OH (hydroxyl) groups.

Accordingly, the reaction is performed under the condition that the polyhydric alcohol is excessive. More specifically, the equivalent ratio of the polybasic acid to the polyhydric alcohol may preferably be in the range of 100:105–300. The resultant polyester oligomer is provided with a higher molecular weight when the ratio approaches 100:105 and a lower molecular weight when the ratio approaches 100:300.

The polyester (meth)acrylate (A) should have a number-average molecular weight of at least 700. If the number-average molecular weight is below 700, the resultant resin composition is liable to shrink considerably on curing and the cured product suffers from a lack of accuracy resulting in a poor shape. The polyester (meth)acrylate (A) may preferably have a number-average molecular weight of 700–5000, particularly 800–3000.

The number-average molecular weight of the polyester (meth)acrylate (A) may be controlled by the degree of polymerization of the polyester oligomer which in turn is determined by the selection of the polybasic acid and the polyhydric alcohol and the ratio therebetween, and also by the selection of the diisocyanate.

The number-average molecular weight value referred to herein is based on values measured as corresponding to those of standard polystyrenes according to the GPC (gel permeation chromatography) by using a commercially available instrument ("M-600", available from Nippon Millipore Ltd.) and a sample solution in THF (tetrahydrofuran) at a concentration of 0.1 wt. %.

Examples of the polyfunctional (meth)acrylate (B) having a number-average molecular weight of below 700 may include: neopentyl glycol hydroxypivarate di(meth)acrylate, 2,2-dimethyl-3-hydroxypropyl-2,2-dimethyl-3-hydroxypropionate di(meth)acrylate, ethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, glycerol di(meth)acrylate, neopentyl glycol di(meth)acrylate, neopentyl glycol hydroxypivarate di(meth)acrylate, bisphenol A ethylene oxide-adduct di(meth)acrylate, bisphenol A propylene oxide-adduct di(meth)acrylate, 2,2'-di(hydroxypropoxyphenyl)propane di(meth)acrylate, 2,2'-di(hydroxyethoxyphenyl)propane di(meth)acrylate, tricyclodecanedimethylol di(meth)acrylate, 2,2'-di(glycidyloxyphenyl)propane di(meth)acrylate, trimethylolpropane tri(meth)acrylate, pentaerythritol tri(meth)acrylate, pentaerythritol tetra(meth)acrylate, dipentaerythritol hexa(meth)acrylate, tetramethylolmethane tri(meth)acrylate, tetramethylolmethane tetra(meth)acrylate, tris(2-hydroxyethyl)isocyanurate tri(meth)acrylate, and trimellitic acid tri(meth)acrylate. These examples of the polyfunctional (meth)acrylate (B) may be used singly or in mixture of two or more species. The polyfunctional (meth)acrylate (B) may preferably have two to four functional groups.

If the (meth)acrylate (B) has a number-average molecular weight of 700 or larger, the resultant cured product is liable to have a large thermal distortion. The polyfunctional (meth)acrylate (B) may preferably have a number-average molecular weight of 100–650.

Preferred examples of the monofunctional (meth)acrylate (C) may include: methyl (meth)acrylate, ethyl (meth)acrylate, cyclohexyl (meth)acrylate, dicyclopentyl (meth)acrylate, isophoronyl (meth)acrylate, phoronyl (meth)acrylate, phenyl (meth)acrylate, benzyl (meth)acrylate, α-naphthyl (meth)acrylate, β-naphthyl (meth)acrylate, and dicyclopentenyloxyethyl (meth)acrylate.

Examples of the photopolymerization initiator (D) may include: benzophenone and substitution derivatives thereof, such as hydroxybenzophenone methanesulfonate ester, methyl-O-benzoylbenzoate and p-dimethylaminobenzophenone; benzoic and substitution derivatives thereof, such as benzoic allyl ester, and benzoin alkyl ethers including alkyls, such as methyl, ethyl, isobutyl and isopropyl; acetophenone and substitution derivatives thereof, such as diethoxyacetophenone, 1-hydroxycyclohexyl phenyl ketone, benzyl methyl ketal, 2-hydroxy-2-methylpropiophenone, 1-(4-isopropylphenyl)-2-hydroxy-2-methylpropiophenone, and 1-(4-isopropylphenyl)-2-hydroxy-2-methylpropiophenone; benzil, and oximes, such as 1-phenyl-1,2-propanedione-2-o-benzoyl oxime. These initiators may be used singly or in mixture of two or more species.

The photocurable resin composition according to the present invention may further contain optional additives which may include known polymerization accelerators, polymerization inhibitors, release agents, surface-smoothening agents, and anti-foaming agents.

In the photocurable resin composition according to the present invention, the polyfunctional urethane-modified polyester (meth)acrylate (A) functions to improve the durability against heat, moisture and ultraviolet rays.

The polyfunctional (meth)acrylate (B) is effective in providing a cured product showing an increased hardness and a reduced thermal deformation.

The resin composition according to the present invention provides a cured product which shows less of a decrease in Young's modulus accompanying a temperature increase and thus shows a reduced thermal deformation. Accordingly, the optical lens according to the present invention, when provided with an anti-reflection layer on the surface, is free from cracking or peeling of the anti-reflection layer due to a temperature change. The cured product of the resin composition according to the present invention may preferably show a Young's modulus at 100° C. which is at least 2% of the Young's modulus at 20° C. It is desired that the Young's modulus at 100° C. is identical to that at 20° C., but this is impossible. Accordingly, the Young's modulus at 100° C. may preferably be 2–90%, more preferably 10–90%, of that at 20° C.

The Young's moduli referred to herein are based on values measured by using a solid visco-elasticity meter ("RSA-2", available from Rheometrix Co.). More specifically, a resin composition is shaped into a test piece (dumbbell No. 2 according to JIS K7113) and cured with at least 10 Joules/$cm^2$ of ultraviolet rays. The test piece is held by two chucks (span: 23 mm) of the meter and supplied with a tensile strain of 0.1% at a cycle of 3.5 Hz. The temperature raising rate may be 3° C./min.

The monofunctional (meth)acrylate (C) is effective in providing the resin composition according to the present invention with an appropriate fluidity or viscosity.

Regarding the contents of the respective components based on the total of the components (A)–(C) as 100 wt. % (the same standard being used herein unless otherwise noted specifically), the content of the component (A) may preferably be 10–90 wt. %, further preferably 25–70 wt. %. Below 10 wt. %, the durability is lowered and, in excess of 90 wt. %, the resin composition is caused to have an excessively high viscosity.

The content of the component (B) may preferably be 30–70 wt. %. Below 30 wt. %, the resultant cured product is liable to have a large thermal deformability. In excess of 70 wt. %, the cured product is liable to be brittle, and a considerable shrinkage is liable to be caused at the time of curing of the composition.

The component (C) may preferably be 10–90 wt. %, further preferably 25–70 wt. %.

The component (D) may preferably be 0.1–5 wt. %.

In the present invention, it is preferred to provide a cured product showing a Young's modulus ratio (at 100° C./at 20° C.) in the range of 10–90 %. In order to accomplish this condition, it is preferred that the photocurable resin composition according to the present invention comprises 25–45 wt. % of the component (A), 31–50 wt. % of the component (B) and 5–44 wt. % of the component (C).

According to an embodiment as shown in FIG. 1, the optical lens of the present invention may comprise a base member 1 in the form of, e.g., a glass lens, coated with a cured resin layer 2 formed from the resin composition according to the present invention. The resin layer 2 may be further coated with an anti-reflection layer, as desired.

Ordinarily, the base material 1 may preferably be in the form of a lens formed by spherically abrading and polishing an optical glass member but can be a resinous lens if desired.

The anti-reflection layer may comprise a single layer or plural layers in lamination of materials, such as $SiO_2$, $SiO$, $MgF_2$, $TiO_2$, $Ti_2O_3$, $Al_2O_3$, $CeO_2$, $La_2O_3$, $Y_2O_3$ and $ZrO_2$. Such an anti-reflection layer may be formed by, e.g., vacuum evaporation, sputtering, or ion plating.

The resin layer 2 may preferably be formed in a thickness in the range of 10–300 μm. The anti-reflection layer may preferably be formed in a thickness of 0.05–1.0 μm.

The optical lens accordingly to the present invention may be most advantageously embodied as an aspherical lens but can also be embodied as an ordinary spherical lens.

Figure 2:
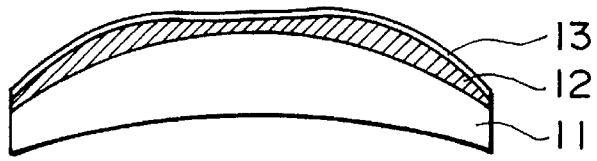
Figure 3:
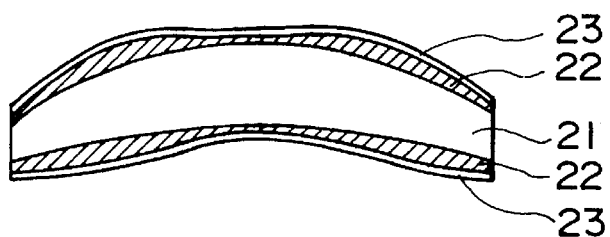
Figure 4:
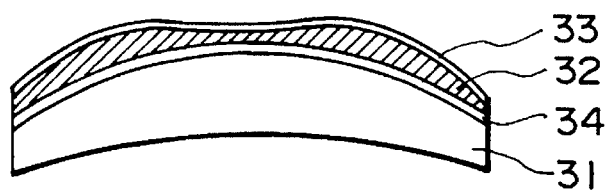

FIGS. 2–4 respectively show another embodiment of the optical lens according to the present invention. The optical lens shown in FIG. 2 comprises a base member 11 having a convex surface coated successively with a resin layer 12 and an anti-reflection layer 13.

The optical lens shown in FIG. 3 comprises a base member 21, both surfaces of which are successively coated with a resin layer 22 and an anti-reflection layer 23.

The optical lens shown in FIG. 4 comprises a base member 31 having a convex surface successively coated with a primer layer 34, a resin layer 32 and an anti-reflection layer 33. Such a primer layer 34 may be formed by, e.g., a silane coupling agent so as to strengthen the adhesion between the resin layer 32 and the base member 31.

An optical lens according to the present invention, e.g., in the form shown in FIG. 1, may be produced, e.g., in a manner as illustrated in FIGS. 5–7. More specifically, as shown in FIG. 5, onto a surface to be coated of a base member 1, a resin composition 4 of the present invention is supplied. Then, as shown in FIG. 6, a mold 5 is pressed onto the base member 1 with a prescribed spacing therefrom to form a resin layer 2 thereat, which is then irradiated with ultraviolet rays at a rate of, e.g., at least 10 Joules/$cm^2$ incident through the base member to be cured. Finally, as shown in FIG. 7, the mold 5 is separated from the cured resin layer 2 to obtain an optical lens according to the present invention.

The photocurable resin composition according to the present invention may be cured on exposure to actinic rays, preferably ultraviolet rays from a light source, such as a chemical lamp, a low-pressure mercury lamp, a high-pressure mercury lamp, a carbon arc lamp, or a xenone lamp.

EXAMPLES

Hereinbelow, the present invention will be described more specifically based on examples.

PRODUCTION EXAMPLE (I) OF COMPONENT (A)

In a four-neck flask equipped with a condenser, an $N_2$ gas-supply pipe, a thermometer and a stirrer, 49 g of phthalic anhydride (polybasic acid) and 114 g propylene glycol (polyhydric alcohol) were placed and stirred under heating in a nitrogen atmosphere. The system was heated to 150° C. and held at that temperature for 2 hours. Thereafter, the system was gradually heated and held at 230° C. to proceed the reaction. The reaction was completed when the acid value reached 5 or below. After cooling to room temperature, 166 g of 1,4-cyclohexylene diisocyanate, 174 g of 2-hydroxyethyl acrylate and 0.11 g of dibutyltin dilaurate were added, and the reaction was continued for 3 hours under moderate heating so that the system temperature did not exceed 80° C. Then, the system was heated to 100° C. within 1 hour, followed by 3 hours of reaction thereat, to obtain a urethane modified polyester acrylate (I) having a number-average molecular weight (Mn) of 860.

PRODUCTION EXAMPLE (II)

77 g of trimellitic anhydride (polybasic acid) and 182 g of propylene glycol (polyhydric alcohol) were reacted similarly as in Production Example (I). After cooling to room temperature, 265 g of isophorone diisocyanate, 186 g of 2-hydroxyethyl acrylate and 0.16 g of dibutyltin dilaurate were added, and the reaction was performed under similar conditions as Production Example (I) to prepare a urethane-modified polyester acrylate (II) having a number-average molecular weight of 1500.

PRODUCTION EXAMPLE (III)

135 g of tetrahydrophthalic anhydride (polybasic acid) and 40 g of trimethylolpropane and 97 g of 1,3-butylene glycol (polyhydric alcohols) were reacted similarly as in Production Example (I). After cooling to room temperature, 177 g of isophorone diisocyanate, 143 g of 3-hydroxypropyl acrylate and 0.12 g of dibutyltin dilaurate were added, and the reaction was performed under similar conditions as in Production Example (I) to prepare a urethane-modified polyacrylate (III) having a number-average molecular weight of 1400.

PRODUCTION EXAMPLE (IV)

1168 g of adipic acid (polybasic acid), 930 g of 1,4-butanediol (polyhydric alcohol) and 0.5 g of p-toluenesulfonic acid (catalyst) were subjected to a similar reaction as in Production Example (I). An excess of the 1,4-butanediol was distilled off under a reduced pressure to complete the reaction. After cooling to room temperature, 398 g of isophorone diisocyanate, 232 g of 2-hydroxyethyl acrylate and 2 g of dibutyltin laurate were added, and the reaction was performed under similar conditions as in Production Example (I).

PRODUCTION EXAMPLE (V) (COMPARATIVE)

59 g of maleic anhydride (polybasic acid) and 91 g of propylene glycol (polyhydric alcohol) were reacted similarly as in Production Example (I). After cooling to room temperature, 169 g of 2-isocyanate-ethyl acrylate and 0.08 g of dibutyltin laurate were added to the system, and the reaction was thereafter performed similarly as in Production Example (I) to obtain a urethane-modified polyester acrylate (V) having a number-average molecular weight of 510.

The above-prepared acrylates (I)–(V) as Component (A) were blended with Components (B)–(D) shown in Table 1 appearing hereinafter in ratios also shown in Table 1 to prepare 7 photocurable resin compositions (Example 1–6 and Comparative Example 1).

Aspherical optical lenses each having a structure generally as shown in FIG. 1 were prepared as follows. A concave-concave optical glass 1 (material BK-7, available from OHARA K.K.) having a first concave surface with a curvature radius of 229.4 mm, a second concave surface with a curvature radius of 56.5 mm and a thickness at the central part of 2.2 mm was coated on the second concave surface with each of the above-prepared photocurable resin compositions, followed by curing by exposure for 2 min. to ultraviolet rays from a 50 mW mercury-xenon lamp to form a cured resin layer 2 having thicknesses of 20 microns at the center, 40 microns at the periphery and 130 microns at the mid part between the center and the periphery. The resin layer 2 was further coated with a laminate anti-reflection layer successively including 300 nm-thick SiO layer, 250 mm-thick $TiO_2$ layer and 125 nm-thick $SiO_2$ layer, respectively formed by vacuum evaporation.

In this way, 7 types of optical lenses were prepared each in a plurality, and each type of optical lenses were subjected to the following two types of durability test.

DURABILITY TEST (I)

Left standing for 500 hours in a high temperature—high humidity vessel of 70° C. and 85% RH.

DURABILITY TEST (II)

Subjected to 20 cycles each including 2 hours of standing at a low temperature of −30° C. and subsequent 2 hours of standing in a high temperature—high humidity of 60° C. and 60% RH.

The respective lenses subjected to either one of the above durability tests (I) and (II) were evaluated with respect to the following items. The results are shown in Table 2.

(1) Appearance

The cured resin layer and the anti-reflection layer were observed visually as to whether cracking, corrosion, bubbles, peeling and marked color change were present or not. The appearance was judged to be good where no change was observed.

(2) Shape Accuracy

The surface of an optical lens was observed through a Fizeau-type interference meter (available from Zygo Co.) and the surface shape accuracy thereof was evaluated by a disorder in interference fringe in the unit of micron.

(3) Wear Resistance

The surface of the anti-reflection layer was rubbed with a lens-cleaning paper ten times at a load of 300 g, and the appearance thereafter was observed visually. The wear resistance was judged to be good where no change was observed.

(4) Solvent Resistance

The surface of the anti-reflection layer was rubbed ten times at a load of 300 g with a lens-cleaning paper impregnated with an alcohol-ether type solvent. Thereafter, the appearance was observed, and a sample with no change was judged to be good.

(5) Adhesion

An adhesive tape ("CT-18", available from Nichiban K.K.) was applied to and peeled from the anti-reflection layer three cycles. Thereafter, the appearance of the anti-reflection layer was observed, and a sample with no change was judged to be good.

In addition to the above, each resin composition was shaped into a cured dumbbell test piece to measure a Young's modulus ratio (at 100° C./at 20° C.).

The results are shown in Table 1.

As is understood from the results of Table 2, the optical lenses of Examples 1–6 all showed good results, but the optical lens of Comparative Example 1 showed a poor shape accuracy after the durability test so that it was evaluated to be unsuitable as an optical lens.

TABLE 1

| | | | Composition (weight parts) | | | | | | |
|---|---|---|---|---|---|---|---|---|---|
| | Compo- | | Example | | | | | | Comp. |
| | nent | Mn | 1 | 2 | 3 | 4 | 5 | 6 | Ex. 1 |
| Urethane-modified polyester acrylate (I) | (A) | 860 | | | | | | 20 | |
| Urethane-modified polyester acrylate (II) | (A) | 1500 | | | | 22 | 20 | 35 | 20 |
| Urethane-modified polyester acrylate (III) | (A) | 1400 | | 32 | | | | | |
| Urethane-modified polyester acrylate (IV) | (A) | 3000 | 25 | | | 22 | 20 | | |
| Urethane-modified polyester acrylate (V) | (A) | 510 | | | | | | | 50 |
| Trimethylolpropane triacrylate | (B) | 296 | | 20 | | | | | |
| Dipentaerythritol hexaacrylate | (B) | 578 | | | | 20 | | 20 | 10 |
| Tris(2-acryloxyethyl) isocyanurate | (B) | 423 | 15 | 16 | 31 | 15 | | 15 | 15 |
| Trimethylolpropane-propoxy triacrylate | (B) | 470 | 50 | | | | 29 | | |
| Cyclohexyl acrylate | (C) | — | 10 | | 25 | 25 | 36 | 25 | 25 |
| Dicyclohexyloxyethyl methacrylate | (C) | — | | 32 | | | | | |
| 1-Hydroxycyclohexyl phenyl ketone | (D) | — | 2 | 3 | 1 | 1 | 1 | 2 | 2 |
| Young's modulus ratio (at 100° C./at 20° C.) | | | 18 | 6.2 | 44 | 22 | 1.2 | 20 | 0.5 |

TABLE 2

| | Evaluation of optical lenses | | | | | | |
|---|---|---|---|---|---|---|---|
| | Example | | | | | | Comp. |
| | 1 | 2 | 3 | 4 | 5 | 6 | Ex. 1 |
| Durability Test (I) | | | | | | | |
| Appearance | good | good | good | good | good | good | good |
| Shape accuracy (μm) | ±0.4 | ±0.9 | ±0.4 | ±0.6 | ±0.4 | ±0.6 | ±3.5 |
| Wear resistance | good | good | good | good | *1 | good | good |
| Solvent resistance | good | good | good | good | *1 | good | good |
| Adhesion | good | good | good | good | good | good | good |
| Durability Test (II) | | | | | | | |
| Appearance | good | good | good | good | good | good | good |
| Shape accureacy (μm) | ±0.4 | ±0.9 | ±0.4 | ±0.6 | ±0.4 | ±0.6 | ±3.5 |
| Wear resistance | good | good | good | good | good | good | good |
| Solvent resistance | good | good | good | good | good | good | good |
| Adhesion | good | good | good | good | good | good | good |

*1: Slight change was observed at the peripheral part, but it was practically acceptable.

What is claimed is:

1. A photocurable resin composition, comprising:

(A) 25–45 wt. % of a polyfunctional urethane-modified polyester (meth)acrylate comprising a polyester oligomer and a plurality of (meth)acryloyl groups bonded to the polyester oligomer via a urethane group, and having a number-average molecular weight of at least 700, (B) 31–70 wt. % of, a polyfunctional (meth)acrylate having a number-average molecular weight of less than 700, (C) 5–55 wt. % of a monofunctional (meth)acrylate, and (D) a photopolymerization initiator wherein the weight percentages of the respective components are based on the total of the components (A), (B) and (C) as 100 wt. %.

2. A composition according to claim 1, wherein said polyfunctional urethane-modified polyester (meth)acrylate comprises 2–4 (meth)acryloyl groups.

3. A composition according to claim 1, wherein said polyfunctional urethane-modified polyester (meth)acrylate (A) has a number-average molecular weight of 700–5000.

4. A composition according to claim 3, wherein said polyfunctional urethane-modified polyester (meth)acrylate (A) has a number-average molecular weight of 880–3000.

5. A composition according to claim 1, wherein said polyfunctional (meth)acrylate (B) has 2–4 (meth)acryloyl groups.

6. A composition according to claim 1, wherein said polyfunctional (meth)acrylate (B) has a number-average molecular weight of 100–650.

7. An optical lens comprising a base member, and a resin layer formed on the base member and comprising a cured product of a photocurable resin composition comprising:

(A) 25–45 wt. % of a polyfunctional urethane-modified polyester (meth)acrylate comprising a polyester oligomer and a plurality of (meth)acryloyl groups bonded to the polyester oligomer via a urethane group, and having a number-average molecular weight of at least 700, (B) 31–70 wt. % of a polyfunctional (meth)acrylate having a number-average molecular weight of less than 700, (C) 5–44 wt. % of a monofunctional (meth)acrylate, and (D) a photopolymerization initiator, wherein the weight percentages of the respective components are based on the total of the components (A), (B) and (C) as 100 wt. %.

8. A lens according to claim 7, further comprising an anti-reflection layer on the resin layer.

9. A lens according to claim 7, wherein the resin layer shows a Young's modulus at 100° C. which is at least 2% of that at 20° C.

10. A lens according to claim 7, wherein the resin layer shows a Young's modulus at 100° C. which is 10–90% of that at 20° C.

* * * * *

UNITED STATES PATENT AND TRADEMARK OFFICE
CERTIFICATE OF CORRECTION

PATENT NO. : 5,566,027

DATED : October 15, 1996

INVENTORS : OSAMU SAITOH, ET AL.

It is certified that error appears in the above-identified patent and that said Letters Patent is hereby corrected as shown below:

<u>COLUMN 2</u>

Line 40, "lens." should read --lens).--.

<u>COLUMN 9</u>

Line 63, "of," should read --of--;
Line 67, "5-55 wt.%" should read --5-44 wt.%--.

<u>COLUMN 10</u>

Line 1, "initiator wherein" should read --initiator, wherein--.

Signed and Sealed this

Twenty-fifth Day of March, 1997

*Attest:*

BRUCE LEHMAN

*Attesting Officer*    Commissioner of Patents and Trademarks